United States Patent
Li et al.

(10) Patent No.: US 11,796,459 B1
(45) Date of Patent: Oct. 24, 2023

(54) METHOD FOR MEASURING MULTIPLE PARAMETERS OF MIXED GASES BASED ON BROADBAND INFRARED LIGHT SOURCE

(71) Applicant: Xinjiang Technical Institute of Physics and Chemistry, CAS, Urumqi (CN)

(72) Inventors: Linjun Li, Urumqi (CN); Shilie Pan, Urumqi (CN); Yu Zhou, Urumqi (CN); Xiaoming Duan, Urumqi (CN); Qianqian Hao, Urumqi (CN); Yingjie Shen, Urumqi (CN); Xin He, Urumqi (CN); Hongsheng Shi, Urumqi (CN); Zheng Cui, Urumqi (CN)

(73) Assignee: Xinjiang Technical Institute of Physics and Chemistry, CAS, Urumqi (CN)

( * ) Notice: Subject to any disclaimer, the term of this patent is extended or adjusted under 35 U.S.C. 154(b) by 0 days.

(21) Appl. No.: 18/329,585

(22) Filed: Jun. 6, 2023

(30) Foreign Application Priority Data

Oct. 20, 2022 (CN) .......................... 202211283682.2

(51) Int. Cl.
*G01N 21/3504* (2014.01)
*G01N 21/45* (2006.01)

(52) U.S. Cl.
CPC ......... *G01N 21/3504* (2013.01); *G01N 21/45* (2013.01); *G01N 2021/451* (2013.01);
(Continued)

(58) Field of Classification Search
CPC ............... G01N 21/3504; G01N 21/45; G01N 2021/451; G01N 2201/06113; G01N 2201/0631; G01N 2201/0636
(Continued)

(56) References Cited

U.S. PATENT DOCUMENTS 9,835,552 B2 * 12/2017 Wagner .............. G01N 21/3577
10,261,012 B2 * 4/2019 Wagner ................ G01N 33/487

OTHER PUBLICATIONS

Zhang Hanzhuang et al., "Experimental Measurements of Probe Spectra and Refractive Index Properties in Atomic Sodium", Acta Optica Sinica, Apr. 2000, pp. 446-450, vol. 20, No. 4.
(Continued)

*Primary Examiner* — Tri T Ton
(74) *Attorney, Agent, or Firm* — Zhigang Ma

(57) ABSTRACT

A method for measuring multiple parameters of mixed gases based on broadband infrared light source is provided, including: filtering a broadband infrared laser, and forming a laser beam including three narrow-linewidth wavelengths; dividing the laser beam into a first sub-laser beam and a second sub-laser beam; focusing and transmitting the first sub-laser beam to a gas sample cell; focusing and transmitting the first sub-laser beam to a first reflector; reflecting and transmitting the first sub-laser beam; reflecting and transmitting the second sub-laser beam to the second beam splitter; combing the first sub-laser beam transmitted by the second beam splitter and the second sub-laser beam reflected by the second beam splitter, measuring the multiple parameters; combining and transmitting the second sub-laser beam transmitted by the second beam splitter and the first sub-laser beam reflected by the second beam splitter to a spectrometer for measuring concentrations the mixed gases.

8 Claims, 1 Drawing Sheet

(52) U.S. Cl.
CPC ............... *G01N 2201/0631* (2013.01); *G01N 2201/0636* (2013.01); *G01N 2201/06113* (2013.01)

(58) Field of Classification Search
USPC ................................................ 356/432–448
See application file for complete search history.

(56) References Cited

OTHER PUBLICATIONS

Chen Xiao et al., "Design of detecting system for multi-component gases based on single ultra-narrow-linewidth laser", Optics and Precision Engineering, Jul. 2011, pp. 1495-1502, vol. 19, No. 7.
CNIPA, Notification of a First Office Action for CN202211283682.2, dated Dec. 2, 2022.
Harbin Hanao Technology Co., Ltd, Xinjiang Institute of Physical and Chemical Technology, Chinese Academy of Sciences (Applicants), Response to Notification of a First Office Action for CN202211283682.2, w/ (allowed) replacement claims, dated Dec. 13, 2022.
CNIPA Notification to grant patent right for invention in CN202211283682.2, dated Dec. 28, 2022.

\* cited by examiner

METHOD FOR MEASURING MULTIPLE PARAMETERS OF MIXED GASES BASED ON BROADBAND INFRARED LIGHT SOURCE

TECHNICAL FIELD

The present disclosure relates to a gas measurement method, and more particularly to a method for measuring multiple parameters of mixed gases based on broadband infrared light source.

BACKGROUND

Methane, hydrogen sulfide, and sulfur dioxide are harmful gases in the petrochemical field, and are also final decomposition products of sulfur hexafluoride, which is an insulating gas, in a power system. In petrochemical equipment and power system equipment, due to the leakage of these gases, a gas content around the equipment is too high, which is easy to cause explosion and acid rain, endangering the safety of people and the equipment. Therefore, it is particularly important to perform on-line measure on these gases with high precision.

SUMMARY

The purpose of the present disclosure is to solve the technical problem of simultaneous measurement of multiple parameters of mixed gases, and thus a method for measuring multiple parameters of mixed gases based on broadband infrared light source is provided.

Specifically, the present disclosure relates a method for measuring multiple parameters of mixed gases based on broadband infrared light source, which includes:

filtering, by a filter, a broadband infrared laser emitted by a laser, and forming a laser beam including three narrow-linewidth wavelengths;

dividing, by a first beam splitter, the laser beam including the three narrow-linewidth wavelengths into a first sub-laser beam and a second sub-laser beam;

focusing, by a first focusing mirror, the first sub-laser beam, and then transmitting the first sub-laser beam to a gas sample cell having the mixed gases;

focusing, by a second focusing mirror, the first sub-laser beam after passing through the gas sample cell, and transmitting the first sub-laser beam to a first reflector;

reflecting, by the first reflector, the first sub-laser beam, and transmitting the first sub-laser beam to a second beam splitter;

reflecting, by a second reflector, the second sub-laser beam, and transmitting the second sub-laser beam to the second beam splitter;

splitting, by the second beam splitter, the first sub-laser beam and the second sub-laser beam;

combing the first sub-laser beam transmitted by the second beam splitter and the second sub-laser beam reflected by the second beam splitter to obtain a first combined laser beam, and transmitting the first combined laser beam to an interferometer, measuring and calculating, by the interferometer, the multiple parameters of the mixed gases;

combining the second sub-laser beam transmitted by the second beam splitter and the first sub-laser beam reflected by the second beam splitter to obtain a second combined laser beam, and transmitting the second combined laser beam to a spectrometer; and measuring and calculating, by the spectrometer, a concentration of each gas of the mixed gases;

the multiple parameters of the mixed gases include a refractive index n, a pressure P and a temperature T of the mixed gases;

the refractive index n of the mixed gases satisfies the following relationship:

$$n = \frac{N\lambda}{L} + n_0,$$

where N represents a group number of interference fringes of a detection light, $\lambda$ represents one of the three narrow-linewidth wavelengths, L represents a length of the gas sample cell, and $n_0$ represents a refractive index of air;

the pressure P of the mixed gases satisfies the following relationship:

$$P = \frac{P_0 N\lambda}{L(n-1)} + P_0,$$

where $P_0$ represents a standard atmospheric pressure;

the temperature T of the mixed gases satisfies the following relationship:

$$T = \frac{PT_0(n_0 - 1)}{P_0(n-1)},$$

where $T_0$ represents a normal temperature.

In some embodiments, the measuring and calculating, by the spectrometer, the concentration of each gas of the mixed gases includes:

obtaining, by the spectrometer, an absorption spectrum under the three narrow-linewidth wavelengths, and obtaining absorption parameters corresponding to the three narrow-linewidth wavelengths based on the absorption spectrum;

calculating the concentration of each gas of the mixed gases based on the absorption parameters, the concentration of each gas of the mixed gases satisfies the following formula:

$$M = \frac{2\pi Sc}{Lh\omega B},$$

where M represents the concentration of the gas, c represents a speed of light, h represents a Planck constant, $$\omega = \frac{c}{\lambda}$$

represents a frequency corresponding to an absorption peak of the gas, $\lambda$ represents a wavelength corresponding to the absorption peak of the gas and is the one of the three narrow-linewidth wavelengths, B represents an absorption transition constant of the gas, L represents the length of the gas sample cell, and S represents an area surrounded by the absorption peak of the gas.

In some embodiments, a central output wavelength of the broadband infrared laser is 7438.6 nanometers (nm), a spectral width of the broadband infrared laser is 80 nm, central wavelengths of the three narrow-linewidth wavelengths formed by the broadband infrared laser after passing through the filter are 7437.5 nm, 7450.6 nm and 7422.7 nm, respectively, and spectral widths corresponding to the three narrow-linewidth wavelengths are each 1.6 nm.

In some embodiments, a transmittance of the filter corresponding to the three narrow-linewidth wavelengths is 95%, and the wavelengths of 7437.5 nm, 7450.6 nm and 7422.7 nm respectively correspond to strong absorption peaks of methane, hydrogen sulfide and sulfur dioxide.

In some embodiments, a focal length of each of the first focusing mirror and the second focusing mirror is 200 millimeters (mm), each of the first focusing mirror and the second focusing mirror is coated with a high transmittance film with a wavelength range of 7000-8000 nm, the first focusing mirror is configured to focus the first sub-laser beam to the gas sample cell, and the second focusing mirror is configured to focus a laser beam emitted from the gas sample cell to the first reflector.

In some embodiments, each of the first reflector and the second reflector is a plane mirror with an incident angle 45° and coated with a high-reflective film with a wavelength range of 7000-8000 nm, a distance between the first reflector and the second reflector is equal to a distance between the first beam splitter and the second beam splitter, and physical transmission lengths of the first sub-laser beam and the second sub-laser beam are the same.

In some embodiments, the gas sample cell includes two parallel light-transmitting end surfaces, each of the two light-transmitting end surfaces is coated with a high transmittance film with a wavelength range of 7000-8000 nm, and the high transmittance film is configured to reduce loss of the first sub-laser beam and the second sub-laser beam.

In some embodiment, a testing wavelength range of the spectrometer is 7000-8000 nm, and the spectrometer is configured to measure an area profile of an absorption peak of the gas and calculate an area S surrounded by the absorption peak of the gas according to the area profile.

In some embodiments, the mixed gases include Methane, hydrogen sulfide, and sulfur dioxide.

The present disclosure at least has a beneficial effect that multiple parameters of the mixed gases and the concentration of each gas of the mixed gases can be measured simultaneously through the laser with three narrow-linewidth wavelengths formed by the broadband infrared laser after being filtered by the filter.

BRIEF DESCRIPTION OF DRAWINGS

In order to explain the technical solutions in embodiments of the present disclosure more clearly, accompanying drawings needed to be used in the description of the embodiments will be briefly introduced hereinafter. It is apparent that the accompanying drawings in the following description are merely some embodiments of the present disclosure. For ordinary technicians in the art, other drawings can be obtained according to these introduced drawings without paying creative labor.

DETAILED DESCRIPTION OF EMBODIMENTS

In order to make the purpose, technical solutions, and advantages of the present disclosure more clear, the present disclosure will be further described in detail with the accompanying drawings. It is apparent that the described embodiments are merely part of embodiments of the present disclosure, but not all of them. Based on the described embodiments in the present disclosure, all other embodiments obtained by ordinary technicians in the art without creative labor belong to the scope of protection of the present disclosure.

Preferred embodiments of the present disclosure will be described in detail with reference to the accompanying drawings.

In the present disclosure, a mid-infrared laser light source with a spectral width of 70-90 Nanometers (nm) and a central output wavelength of 7438.6 nm is used as a test light source, a spectral width of a laser outputted by the mid-infrared laser light source can be narrowed by a grating with specific parameters after beam splitting, so that central wavelength s of the laser reaching a gas cell coincide with strong absorption peaks of the mixed gases, and parameters of a gas, such as methane, hydrogen sulfide and sulfur dioxide of the mixed gases can be measured by a high-precision and high-sensitivity spectrometer, so as to solve the technical problem of detecting an important leaked gas in the petrochemical equipment and the power system.

Figure 1:
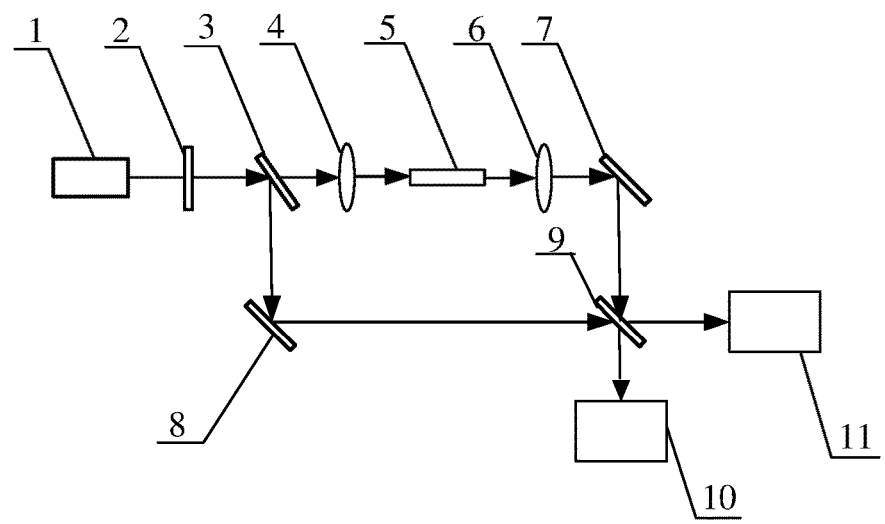
FIG. 1 illustrates a schematic structural view of a device for measuring multiple parameters of mixed gases based on broadband infrared light source.
Figure 2:
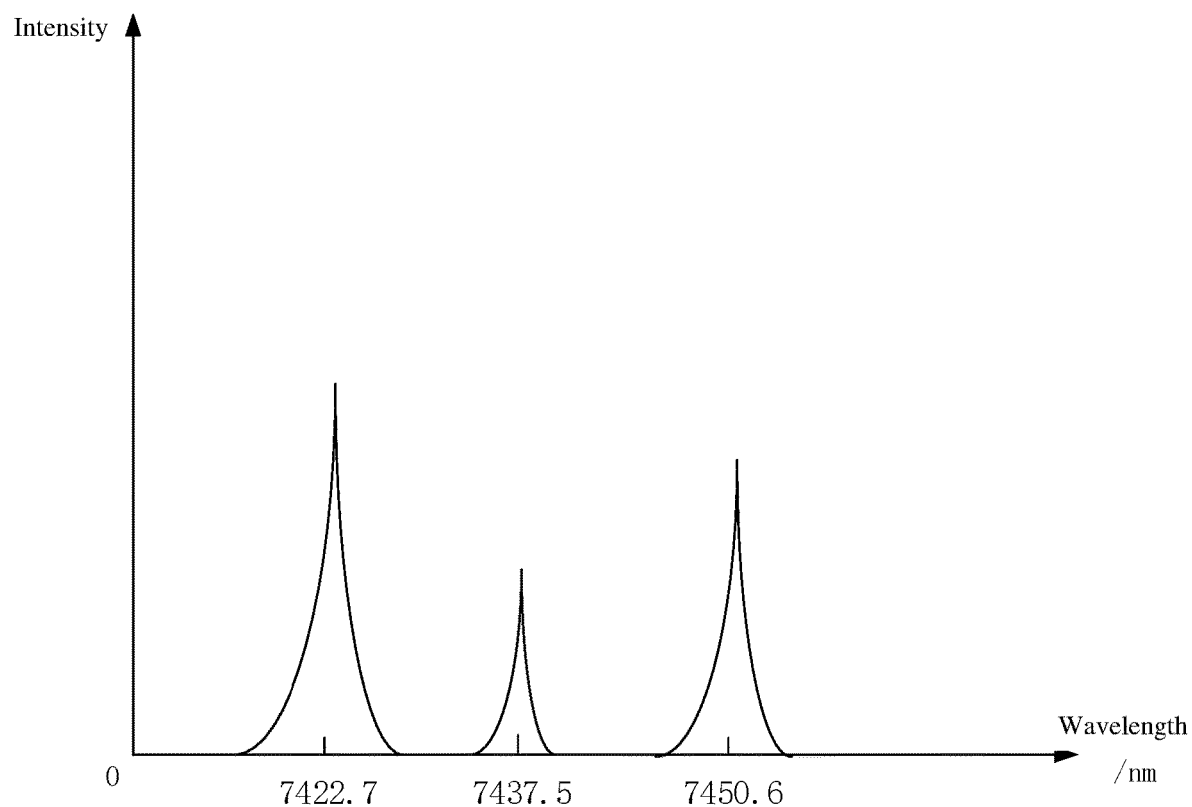
FIG. 2 illustrates a schematic diagram of an image showing absorption peaks measured by a spectrometer according to the present disclosure.

FIG. 1 illustrates a schematic structural view of a device for measuring multiple parameters of mixed gases based on broadband infrared light source. FIG. 2 illustrates a schematic diagram of an image showing absorption peaks measured by a spectrometer according to the present disclosure. FIGS. 1 and 2 are merely schematic views for understanding the embodiments of the present disclosure, which may be not real structures, and are only for reference to quantitative problems involved.

The device is shown in FIG. 1. A laser 1 is configured to emit a broadband infrared laser, and a filter 2 is configured to filter the broadband infrared laser to form a laser beam including three narrow-linewidth wavelengths. A first beam splitter 3 is coated and is configured to split the incident laser beam into a first sub-laser beam and a second sub-laser beam. The first sub-laser beam is focused by a first focusing mirror 4 and then transmitted to a gas sample cell 5 having mixed gases. The first sub-laser beam passes through the gas sample cell 5, is focused by a second focusing mirror 6 and then transmitted to a first reflector 7, and is transmitted to a second beam splitter 9 after being reflected by the first reflector 7, The second sub-laser beam is transmitted to a second reflector 8, and is transmitted to the second beam splitter 9 after being reflected by the second reflector 8. The first sub-laser beam and the second sub-laser beam are split at the second beam splitter 9 and then combined, and the first sub-laser beam transmitted by the second beam splitter 9 and the second sub-laser beam reflected by the second beam splitter 9 are combined and transmitted to an interferometer 10, and multiple parameters of the mixed gases are measured and calculated by the interferometer 10. The second sub-laser beam transmitted by the second beam splitter 9 and the first sub-laser beam reflected by the second beam splitter 9 are combined and transmitted to a spectrometer 11, and a concentration of each gas of the mixed gases is measured and calculated by the spectrometer 11.

Specifically, a method for measuring multiple parameters of mixed gases based on broadband infrared light source includes the following steps:

filtering, by the filter 2, the broadband infrared laser emitted by the laser 1, and forming the laser beam including three narrow-linewidth wavelengths, where the filter 2 can be a grating, and the laser beam including three narrow-linewidth wavelengths is one beam; splitting, by the first beam splitter 3, the laser beam including three narrow-linewidth wavelengths into a first sub-laser beam and a second sub-laser beam, and each of the first sub-laser beam and the second sub-laser beam has the three narrow-linewidth wavelengths; focusing, by the first focusing mirror 4, the first sub-laser beam and then transmitting the first sub-laser beam to the gas sample cell 5 containing the mixed gases, the first sub-laser beam passing through the gas sample cell 5; focusing, by the second focusing mirror 6, the first sub-laser beam after passing through the gas sample cell 5, and then transmitting the first sub-laser beam to the first reflector 7; reflecting, by the first reflector 7, the first sub-laser beam, and transmitting the first sub-laser beam to the second beam splitter 9; transmitting, the second sub-laser beam to the second reflector 8; reflecting, by the second reflector 8, the second sub-laser beam, and transmitting the second sub-laser beam to the second beam splitter 9; splitting, by the second beam splitter 9, the first sub-laser beam and the second sub-laser beam, and then combining the first sub-laser beam and the second sub-laser beam; combining the first sub-laser beam transmitted by the second beam splitter 9 and the second sub-laser beam reflected by the second beam splitter 9 to obtain a first combined laser beam, and transmitting the first combined laser beam to the interferometer 10; measuring and calculating, by the interferometer 10, the multiple parameters of the mixed gases; combining the second sub-laser beam transmitted by the second beam splitter 9 and the first sub-laser beam reflected by the second beam splitter 9 to obtain a second combined laser beam, and transmitting, the second combined laser beam to the spectrometer 11; and measuring and calculating, by the spectrometer 11, a concentration of each gas of the mixed gases. The multiple parameters of the mixed gases include a refractive index n, a pressure P and a temperature T of the mixed gases.

The refractive index n of the mixed gases satisfies the following relationship:

$$n = \frac{N\lambda}{L} + n_0.$$

N represents a group number of interference fringes corresponding to a detection light (i.e., the laser beam including three narrow-linewidth wavelengths), and a specific value of N can be obtained through an interference image of the interferometer 10. In an embodiment of the present disclosure, the interference fringes are generated by three narrow-line width wavelengths at the same time, and A groups of interference fringes are generated, each group of the N groups of interference fringes includes three interference fringes with narrow intervals, N represents the number of the groups of interference fringes, rather than the number of the interference fringes. λ represents a wavelength of the detection light, in the method of the present disclosure, the wavelength of the detection light can be determined as any one of the above three narrow-linewidth wavelengths. Because the wavelength of the detection light is greatly different from a length L of the gas sample cell in order of magnitude, the wavelength of the detection light has little influence on the measurement of the concentrations. L represents the length of the gas sample cell, which may be in a range of 5-10 centimeters (cm). $n_0$ represents a refractive index of air. In an embodiment, in order to obtain more accurate parameters, λ may be an average of the three narrow-linewidth wavelengths.

The pressure P of the mixed gases satisfies the following relationship:

$$P = \frac{P_0 N \lambda}{L(n-1)} + P_0,$$

where $P_0$ represents a standard atmospheric pressure. The temperature T of the mixed gases satisfies the following relationship:

$$T = \frac{PT_0(n_0 - 1)}{P_0(n-1)},$$

where $T_0$ represents a normal temperature, and is for example in a range of 20-30° C.

In some embodiments, the measuring and calculating, by the spectrometer 11, the concentrations of the mixed gases includes:

obtaining, by the spectrometer 11, an absorption spectrum under the three narrow-linewidth wavelengths, as shown in the schematic view of FIG. 2; and obtaining absorption parameters corresponding to the three narrow-linewidth wavelengths based on the absorption spectrum; and calculating a concentration of each gas of the mixed gases based on the absorption parameters, where the concentration of each gas of the mixed gases satisfies the following formula:

$$M = \frac{2\pi Sc}{Lh\omega B},$$

M represents the concentration of the gas, c represents a speed of light. h represents a Planck constant, $$\omega = \frac{c}{\lambda}$$

represents a frequency corresponding to an absorption peak of the gas, λ represents a wavelength corresponding to the absorption peak of the gas, values of the three narrow-linewidth wavelengths are different from each other, and the concentrations of the mixed gases at different wavelength values are calculated, B represents an absorption transition constant of the gas, L represents the length of the gas sample cell, S represents an area surrounded by the absorption peak of the gas, which can be calculated through a software provided by the spectrometer, In some embodiments, as shown in FIG. 2, the central wavelength of the broadband infrared laser is 7438.6 nm, and the spectral width is 80 nm. Multiple required wavelengths can be obtained by the infrared laser with a certain width. For example, the central wavelengths of the three narrow-linewidth wavelengths formed by the broadband infrared laser after passing through the filter 2 are 7437.5 nm, 7450.6 nm and 7422.7 nm, respectively. These different wavelengths correspond to strong absorption peaks of the mixed gases, so that the absorption spectra at these different wavelengths can be measured by the spectrometer. The spectral widths corresponding to the three narrow-linewidth wavelengths are each 1.6 nm. The forming of the narrow-linewidth wavelengths is beneficial to the absorption of corresponding gases, and a clear absorption spectral image at the central wavelengths can be obtained. When the spectral width is greater than 5 nm, the specific absorption central wavelength cannot be clearly determined in the absorption spectrum, especially for the absorption measurement of multiple gases, the overlapping of absorption spectra of the multiple gases is easier to be caused, and thus it is impossible to determine types and various parameters of the multiple gases. Therefore, the spectral width of each measuring laser (i.e., the three lasers with the three narrow-linewidth wavelengths) should be less than 2 nm, for example, the spectral widths corresponding to the three narrow-linewidth wavelengths determined in the present disclosure are each 1.6 nm.

In some embodiments, a transmittance of the filter 2 corresponding to the three narrow-linewidth wavelengths is 95%. Experiments show that only when the transmittance is higher than 90%, each measuring laser can be ensured to have high measuring power, such that each measuring laser can still have enough power to reach the spectrometer 11 and the interferometer 10 after penetrating the measuring gases (i.e. the mixed gases), thereby forming a clear spectral image and interference fringes, which is convenient for subsequent analysis and calculation. Only the three narrow-linewidth wavelengths 7437.5 nm, 7450.6 nm and 7422.7 nm can transmit through the filter 2, and other wavelengths are prohibited by the filter 2. The wavelengths of 7437.5 nm, 7450.6 nm and 7422.7 nm respectively correspond to strong absorption peaks of methane, hydrogen sulfide and sulfur dioxide.

In some embodiments, the first focusing mirror 4 and the second focusing mirror 6 are convex lenses, each of which has a focal length of 200 millimeters (mm) and a diameter of 30 mm. Each of the first focusing mirror 4 and the second focusing mirror 6 is coated with a high transmittance film with a wavelength range of 7000-8000 nm. The first focusing mirror 4 is configured to focus the first sub-laser beam to the gas sample cell 5, and the second focusing mirror 6 is configured to focus the first sub-laser beam emitted from the gas sample cell to the first reflector 7.

The first beam splitter 3 divides the laser emitted by the laser 1 after being filtered by the filter 2 into two laser beams. For example, the first beam splitter 3 may have a transmissivity of 50% and a reflectivity of 50%, the first sub-laser beam and the second sub-laser beam divided by the first beam splitter 3 have the same power, or the first beam splitter 3 may have a transmissivity of 60% and a reflectivity of 40% reflection, so that the first sub-laser beam still has considerable energy to interfere with the second sub-laser beam after passing through the gas sample cell. The second beam splitter 9 re-splits the first sub-laser beam and the second sub-laser beam transmitted to the second beam splitter 9 into two laser beams, one of which is a laser beam combined through the first sub-laser beam reflected by the second beam splitter and the second sub-laser beam transmitted by the second beam splitter 9, and the other is a laser beam combined through the first sub-laser beam transmitted by the second beam splitter 9 and the second sub-laser beam reflected by the second beam splitter 9, and all the laser beams recombined by the second beam splitter 9 form interference phenomena.

In some embodiments, each of the first reflector 7 and the second reflector 8 is a plane mirror with an incident angle 45° (i.e., the first and second sub-laser beams are respectively incident on the first reflector 7 and the second reflector 8 at an angle of 45 degree) and coated with a high-reflective film with a wavelength range of 7000-8000 nm. In an embodiment, each of the first reflector 7 and the second reflector 8 can achieve total reflection, light loss is reduced. A distance between the first reflector 7 and the second reflector 8 is equal to a distance between the first beam splitter 3 and the second beam splitter 9, so as to ensure that physical transmission lengths of the first sub-laser beam and the second sub-laser beam are the same, as such, an optical path difference of the first sub-laser beam and the second sub-laser beam formed after combining of the first sub-laser beam and the second sub-laser beam at the second beam splitter 9 is only caused by the first sub-laser beam passing through the gas sample cell 5, so that an analysis result is more accurate.

In some embodiments, the gas sample cell includes two parallel light-transmitting end surfaces. For example, the two light-transmitting end surfaces are perpendicular to an incident direction of light, the two light-transmitting end surfaces are both coated with a high transmittance film (also referred to as anti-reflecting film) with a wavelength range of 7000-8000 nm, and the high transmittance film is configured to reduce loss of the first sub-laser beam and the second sub-laser beam, so that the loss of incident and emergent laser beams can be ignored. After a detection laser (i.e., the first sub-laser beam) passes through the gas sample cell 5, the detection laser is absorbed by the absorbed gases in the gas sample cell 5, and parameters, such as an energy and an optical path, of the detection laser change correspondingly, and the parameters can be measured by interference and other means, and the parameters of the mixed gases can be further determined.

In some embodiments, as shown in FIG. 2, the spectrometer 11 is a mid-infrared high-precision spectrometer, and a testing wavelength range of the spectrometer 11 is within 7000-8000 nm. The spectrometer 11 can clearly measure an area profile of absorption peaks of the mixed gases, and the area S surrounded by each of the absorption peaks of the mixed gases can be calculated according to a software provided by the spectrometer 11.

According to the present disclosure, multiple parameters of the mixed gases, such as a refractive index n, a pressure P, the temperature T, types and concentrations of the mixed gases, can be measured simultaneously through the laser with three narrow-linewidth wavelengths formed by the broadband infrared laser after being filtered by the filter, so as to solve, the technical problem of detecting important leaked gas in the petrochemical equipment and the power system.

Finally, it should be noted that each embodiment in this specification is described in a progressive way, and each embodiment focuses on the differences from other embodiments, and the same and similar parts between each embodiment can be referred to each other.

The above embodiments are merely used to illustrate the technical solutions of the present disclosure, but not to limit thereto. Although the present disclosure has been described in detail with reference to the foregoing embodiments, those skilled in the art should understand that it is still possible to modify the technical solutions described in the foregoing embodiments, or to replace some technical features with equivalents. However, these modification or replacement do not make the essence of the corresponding technical solutions deviate from the spirit and scope of the technical solutions of various embodiments of the present disclosure.

What is claimed is:

1. A method for measuring multiple parameters of mixed gases based on broadband infrared light source, comprising:
filtering, by a filter, a broadband infrared laser emitted by a laser, and forming a laser beam comprising three narrow-linewidth wavelengths;
dividing, by a first beam splitter, the laser beam comprising the three narrow-linewidth wavelengths into a first sub-laser beam and a second sub-laser beam;
focusing, by a first focusing mirror, the first sub-laser beam, and then transmitting the first sub-laser beam to a gas sample cell having the mixed gases;
focusing, by a second focusing mirror, the first sub-laser beam after passing through the gas sample cell, and transmitting the first sub-laser beam to a first reflector;
reflecting, by the first reflector, the first sub-laser beam, and transmitting the first sub-laser beam to a second beam splitter;
reflecting, by a second reflector, the second sub-laser beam, and transmitting the second sub-laser beam to the second beam splitter;
splitting, by the second beam splitter, the first sub-laser beam and the second sub-laser beam;
combing the first sub-laser beam transmitted by the second beam splitter and the second sub-laser beam reflected by the second beam splitter to obtain a first combined laser beam, and transmitting the first combined laser beam to an interferometer,
measuring and calculating, by the interferometer, the multiple parameters of the mixed gases;
combining the second sub-laser beam transmitted by the second beam splitter and the first sub-laser beam reflected by the second beam splitter to obtain a second combined laser beam, and transmitting, the second combined laser beam to a spectrometer; and
measuring and calculating, by the spectrometer, a concentration of each gas of the mixed gases;
wherein the multiple parameters of the mixed gases comprise a refractive index n, a pressure P and a temperature T of the mixed gases;
wherein the refractive index n of the mixed gases satisfies the following relationship:

$$n = \frac{N\lambda}{L} + n_0,$$

where N represents a group number of interference fringes of a detection light, $\lambda$ represents one of the three narrow-linewidth wavelengths, L represents a length of the gas sample cell, and $n_0$ represents a refractive index of air;
wherein the pressure P of the mixed gases satisfies the following relationship:

$$P = \frac{P_0 N\lambda}{L(n-1)} + P_0,$$

where $P_0$ represents a standard atmospheric pressure;
wherein the temperature T of the mixed gases satisfies the following relationship:

$$T = \frac{PT_0(n_0 - 1)}{P_0(n-1)},$$

where $T_0$ represents a normal temperature;
wherein the measuring and calculating, by the spectrometer, the concentration of each gas of the mixed gases comprises:
obtaining, by the spectrometer, an absorption spectrum under the three narrow-linewidth wavelengths, and obtaining absorption parameters corresponding to the three narrow-linewidth wavelengths based on the absorption spectrum;
calculating the concentration of each gas of the mixed gases based on the absorption parameters, wherein the concentration of each gas of the mixed gases satisfies the following formula:

$$M = \frac{2\pi S c}{Lh\omega B},$$

where M represents the concentration of the gas, c represents a speed of light, h represents a Planck constant, $$\omega = \frac{c}{\lambda}$$

represents a frequency corresponding to an absorption peak of the gas, $\lambda$ represents a wavelength corresponding to the absorption peak of the gas and is the one of the three narrow-linewidth wavelengths, B represents an absorption transition constant of the gas, L represents the length of the gas sample cell, and S represents an area surrounded by the absorption peak of the gas.

2. The method according to claim 1, wherein a central output wavelength of the broadband infrared laser is 7438.6 nanometers (nm), a spectral width of the broadband infrared laser is 80 nm, central wavelengths of the three narrow-linewidth wavelengths formed by the broadband infrared laser after passing through the filter are 7437.5 nm, 7450.6 nm and 7422.7 nm, respectively, and spectral widths corresponding to the three narrow-linewidth wavelengths are each 1.6 nm.

3. The method according to claim 2, wherein a transmittance of the filter corresponding to the three narrow-linewidth wavelengths is 95%, and the wavelengths of 7437.5 nm, 7450.6 nm and 7422.7 nm respectively correspond to strong absorption peaks of methane, hydrogen sulfide and sulfur dioxide.

4. The method according to claim 1, wherein a focal length of each of the first focusing mirror and the second focusing mirror is 200 millimeters (mm), each of the first focusing mirror and the second focusing mirror is coated with a high transmittance film with a wavelength range of 7000-8000 nm, the first focusing mirror is configured to focus the first sub-laser beam to the gas sample cell, and the second focusing mirror is configured to focus a laser beam emitted from the gas sample cell to the first reflector.

5. The method according to claim 1, wherein each of the first reflector and the second reflector is a plane mirror with an incident angle 45° and coated with a high-reflective film with a wavelength range of 7000-8000 nm, a distance between the first reflector and the second reflector is equal to a distance between the first beam splitter and the second beam splitter, and physical transmission lengths of the first sub-laser beam and the second sub-laser beam are the same.

6. The method according to claim 1, wherein the gas sample cell comprises two parallel light-transmitting end surfaces, each of the two light-transmitting end surfaces is coated with a high transmittance film with a wavelength range of 7000-8000 nm, and the high transmittance film is configured to reduce loss of the first sub-laser beam and the second sub-laser beam.

7. The method according to claim 1, wherein a testing wavelength range of the spectrometer is 7000-8000 nm, and the spectrometer is configured to measure an area profile of the absorption peak of the gas and calculate the area S surrounded by the absorption peak of the gas according to the area profile.

8. The method according to claim 1, wherein the mixed gases comprise methane, hydrogen sulfide, and sulfur dioxide.

* * * * *